(12) United States Patent
Tanaka et al.

(10) Patent No.: US 6,790,651 B2
(45) Date of Patent: Sep. 14, 2004

(54) HYBRIDIZATION REACTION APPARATUS AND HYBRIDIZATION METHOD

(75) Inventors: Toshiaki Tanaka, Kanagawa (JP); Mitsuhiro Tachibana, Kanagawa (JP); Shigeru Kijima, Kanagawa (JP)

(73) Assignee: Hitachi Software Engineering Co., Ltd., Kanagawa (JP)

(*) Notice: Subject to any disclaimer, the term of this patent is extended or adjusted under 35 U.S.C. 154(b) by 224 days.

(21) Appl. No.: 10/014,737

(22) Filed: Dec. 11, 2001

(65) Prior Publication Data

US 2002/0072070 A1 Jun. 13, 2002

(30) Foreign Application Priority Data

Dec. 11, 2000 (JP) .......................... 2000-376258

(51) Int. Cl.[7] .................. C12M 1/34; C12Q 1/68; C12P 19/34; C07H 21/02; C07H 21/04
(52) U.S. Cl. .............. 435/287.2; 435/6; 435/91.1; 435/91.2; 536/22.1; 536/23.1; 536/24.3; 536/24.31; 536/24.32; 536/24.33
(58) Field of Search .................. 435/6, 7.1, 91.1, 435/91.2, 287.2; 530/22.1, 23.1, 24.3–24.33

(56) References Cited

U.S. PATENT DOCUMENTS

| | | | |
|---|---|---|---|
| 4,415,270 A | | 11/1983 | Heinis et al. |
| 5,945,334 A | * | 8/1999 | Besemer et al. ............... 435/6 |

* cited by examiner

Primary Examiner—Jeffrey Siew
(74) Attorney, Agent, or Firm—Reed Smith LLP; Stanley P. Fisher, Esq.; Juan Carlos A. Marquez, Esq.

(57) ABSTRACT

According to the present invention, hybridization reaction and washing steps can be carried out continuously without taking out the substrate from the apparatus, thereby simplifying manipulation of the experiment.

A reaction solution or a washing solution is injected with a pump 6 and discharged with a pump 22 into and from a case 3 which accommodates a substrate 1 immobilized with biological substances. As the substrate 1, a disc-shaped substrate with a throughhole at the center is used. An agitator 2 is placed in the throughhole to agitate the reaction solution or the washing solution during the hybridization reaction or the subsequent washing, thereby shortening the reaction time and the washing time.

10 Claims, 11 Drawing Sheets

HYBRIDIZATION REACTION APPARATUS AND HYBRIDIZATION METHOD

PRIORITY INFORMATION

This application claims priority to Japanese Application Serial No. 376258/2000, filed Dec. 11, 2000.

FIELD OF THE INVENTION

The present invention relates to an apparatus and a method for performing a hybridization reaction between a DNA probe and a sample or for washing after the hybridization.

BACKGROUND ART

In the fields of molecular biology and biochemistry, biological polymers such as nucleic acids and proteins from organisms are identified and/or fractionated in order to search for useful genes or to diagnose diseases. A hybridization reaction is often used as a pretreatment for such processes, where a fluorescence-labeled target molecule in a sample is hybridized with a biological polymer (hereinafter, referred to as a "probe") such as a nucleic acid or a protein having a known sequence. A DNA fragment or an RNA fragment is also used as a probe. According to a conventional hybridization reaction, probes are immobilized on a substrate such as a flat-surface rectangular glass plate, on which a hybridization reaction solution containing a target is dropped, which is then covered with a cover glass and left in a thermostat for a predetermined time. After the reaction, the substrate is taken out from the thermostat and left stand or shaken in a washing solution for an hour or longer to remove the non-reacting target from the surface of the substrate. The probes and the target are both biological substances, specifically DNA or RNA. Hybridization may take place between DNA and RNA. Alternatively, a target may be immobilized on a substrate to be subjected to a hybridization reaction with a fluorescence-labeled probe contained in a hybridization reaction solution.

According to a conventional hybridization reaction, the reaction requires very long time as over night (e.g., 15 hours or longer). In addition, the subsequent washing step needs to be performed after taking out the substrate from the thermostat, which renders the whole procedure troublesome and complicated.

In view of these facts relating to hybridization reaction, the present invention has an objective of providing a hybridization reaction apparatus which can shorten the reaction time by enhancing the reaction efficiency.

The present invention also has an objective of providing a hybridization reaction apparatus and a hybridization method, by which the hybridization reaction step and the subsequent washing step can be carried out continuously without the need of taking out the substrate from the apparatus, thereby simplifying the manipulation.

SUMMARY OF THE INVENTION

In order to achieve the above-mentioned objectives, the present invention uses an apparatus comprising: a case for accommodating a substrate on which biological substances such as DNAs are immobilized; a pump for injecting or discharging a reaction solution or a washing solution into or from the case; an agitating mechanism for the solution for enhancing the efficiency of the reaction; and a thermostat for controlling the temperature during the reaction. The substrate used for immobilizing the biological substances is a disc-shaped substrate having a throughhole at the center thereof. The reaction solution and the washing solution are agitated during hybridization reaction and subsequent washing, respectively, thereby shortening the reaction time and the washing time.

Thus, a hybridization reaction apparatus of the present invention is an apparatus for performing hybridization reaction between a biological substance immobilized on a substrate and a biological substance contained in a solution, the apparatus comprising: a case for accommodating the substrate immobilized with the biological substance; an injecting member for injecting a solution into the case; a discharging member for discharging the solution from the case; and an agitating member for agitating the solution injected into the case.

The substrate may be a circular substrate with a throughhole at the center, in which case, the agitating member may comprise a driver that rotates an agitator placed in the throughhole at the center of the substrate. The agitating member (as a shaker) may repeatedly tilt the case by moving the alternate ends of the case up and down. Alternatively, the agitating member may comprise an agitation fan attached to the case and a rotating member for rotating the agitation fan.

The case is detachable from the apparatus.

The injecting member for injecting the solution may comprise a solution selecting valve for selecting between the reaction solution and a washing solution, and an injection pump for sending the solution selected by the solution selecting valve to the case.

A hybridization method according to the present invention is a method for performing hybridization reaction between a biological substance immobilized on a substrate and a biological substance contained in a solution, the method comprising: injecting the solution containing the biological substance into a case accommodating the substrate immobilized with the biological substance; and allowing hybridization reaction while agitating the solution in the case.

Furthermore, a hybridization method according to the present invention is a method for performing hybridization reaction between a biological substance immobilized on a substrate and a biological substance contained in a solution, the method comprising: injecting the solution containing the biological substance and a liquid whose liquid density is lighter than the solution containing the biological substance and thus which does not mix with the solution into a case accommodating the substrate immobilized with the biological substance; and allowing hybridization reaction while agitating the solution containing the biological substance and the liquid in the case while keeping the solution phase and the liquid phase separated from each other. According to this method, the amount of the reaction solution injected in the case can be minimized.

PREFERRED EMBODIMENTS OF THE INVENTION

Hereinafter, a specific embodiment for carrying out the present invention will be described with reference to the accompanying drawings. Herein, hybridization reaction between DNA probes immobilized on a substrate and a labeled DNA target is described. However, the combination of probes and a target is not limited thereto, and specific numerical values that appear in the description are merely an illustration for easy understanding of the present invention and do not limit the present invention.

Figure 1:
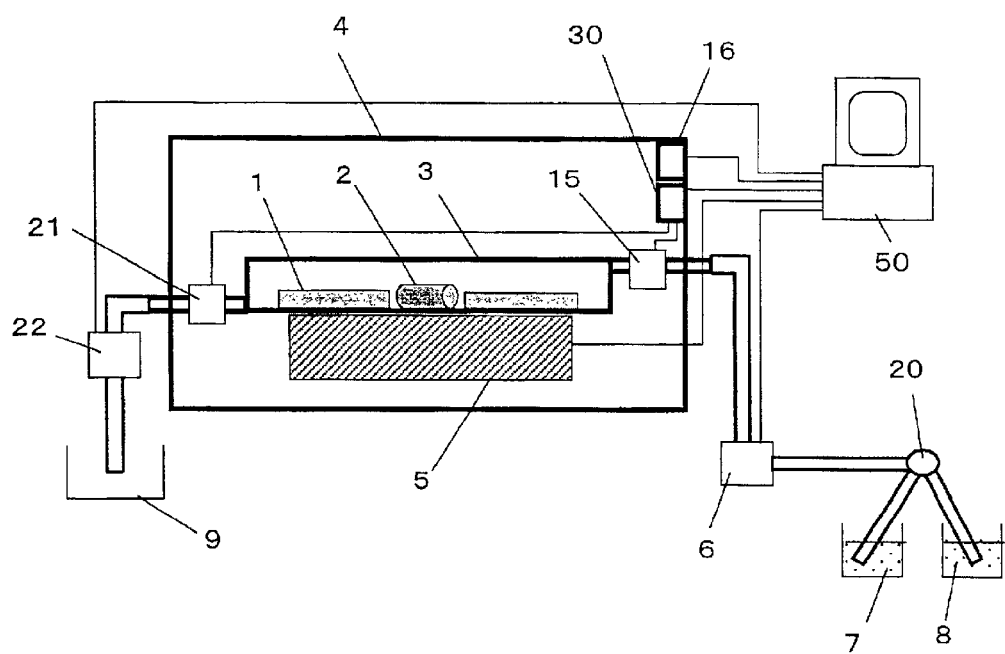
FIG. 1 is a schematic cross-sectional view showing an example of a hybridization reaction apparatus according to the present invention.

FIG. 1 is a schematic cross-sectional view showing an example of a hybridization reaction apparatus according to the present invention. The hybridization reaction apparatus comprises: a case 3 for accommodating a substrate on which probes have been immobilized; a thermostat 4 for maintaining the substrate and the reaction solution at a constant temperature during the reaction; a stirrer 5 for rotating an agitator 2 arranged in the case 3; a solution injecting member for injecting a solution into the case 3; a solution discharging member for discharging the solution from the case 3; and a controller (control PC) 50 for controlling each part of the apparatus according to the stages of the hybridization reaction and the subsequent washing. The case 3 and the stirrer 5 are placed in the thermostat 4 that maintains a constant temperature by a temperature controller 16 including a heat source and a member for controlling the heat source.

The solution injecting member is provided with: a solution selecting valve 20 for selecting between a reaction solution reservoir 7 or a washing solution reservoir 8; an injection pump 6 for injecting a solution in the reservoir selected with the solution selecting valve 20 into the case; and pipes for connecting between the reservoirs 7 or 8 and the solution selecting valve 20, between the solution selecting valve 20 and the injection pump 6 and between the injection pump 6 and a solution inlet of the case 3. The solution discharging member is provided with a discharge pump 22 and a drainage reservoir 9. The controller 50 controls the solution selecting valve 20, the injection pump 6, the discharge pump 22, a later-described injection valve unit 15 and discharge valve unit 21, the temperature controller 16 and the stirrer 5 according to a pre-programmed procedure. The reaction solution contains SSC as an organic solvent, SDS as a surfactant, a labeled DNA target as a sample and water.

Figure 2A:
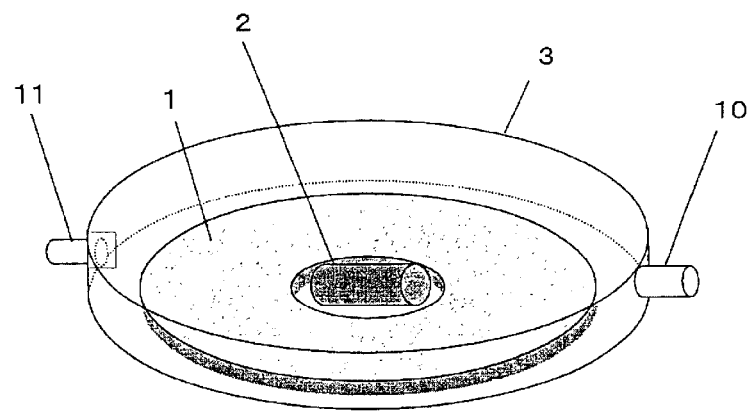
FIGS. 2A and 2B are schematic views showing a structure of a case where an agitator is used for agitation.
Figure 2B:
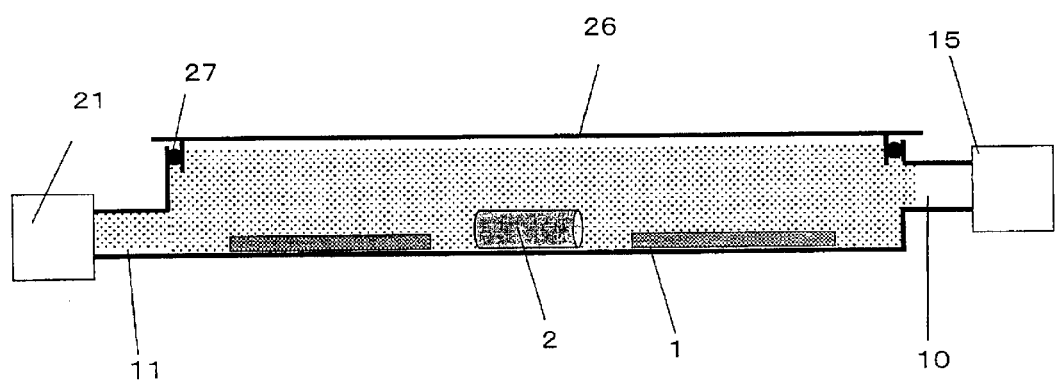

FIGS. 2A and 2B are a perspective view and a cross-sectional view, respectively, schematically showing an exemplary structure of the case and the substrate.

The substrate 1 is a 50 mm-diameter disc-shaped glass plate with a thickness of 1 mm and having a 25-diameter throughhole at the center. On the surface of this substrate 1, various types of probe DNAs are immobilized along a track in a concentric manner or in a spiral manner.

Figure 3:
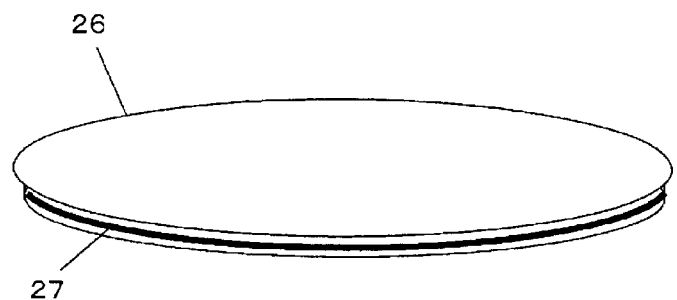
FIG. 3 is a schematic view showing a lid of the case.

The case 3 is a polycarbonate circular case with a thickness of about 1 mm, a diameter of 70 mm and a height of 20 mm. The case 3 is provided with an openable lid 26 at the top which can be removed to place in or take out the disc-shaped substrate 1 and/or the agitator 2. The periphery of the lid 26 can be provided with a sealing rubber 27 to seal the case as shown in FIG. 3. The circular case 3 has a solution inlet 10 at one end of its diameter and a solution outlet 11 at the other end of the diameter. The solution inlet 10 is provided at a higher position of the case while the solution outlet 11 is provided at a lower position of the case to be able to discharge the entire amount of the solution from the case. In order to ensure the sealing of the case, the solution inlet 10 is provided 5 mm below the top of the case. The solution inlet 10 is attached to the injection valve unit 15 while the solution outlet 11 is attached to the discharge valve unit 21.

Figure 4:
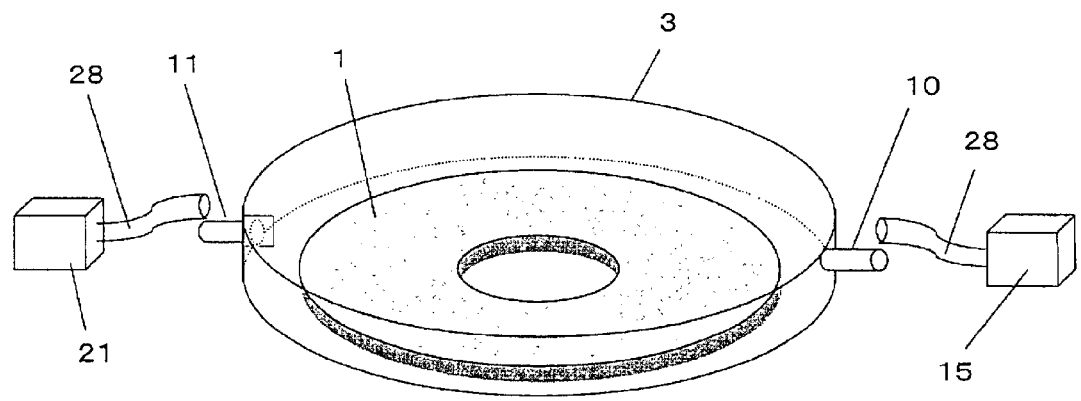
FIG. 4 is a schematic view showing a case detached from a thermostat.
Figure 5A:
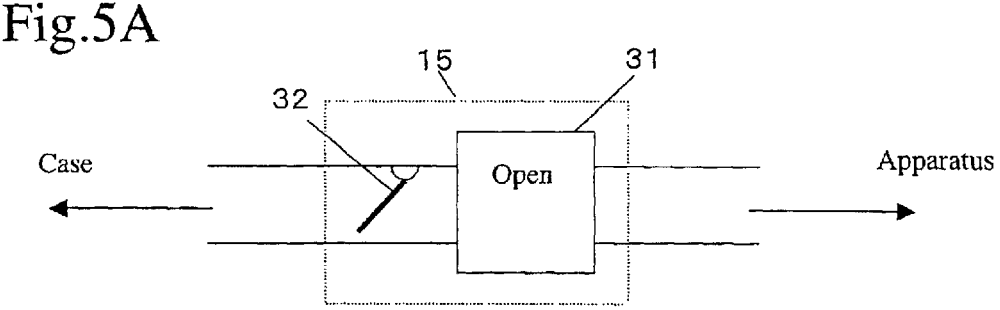
FIGS. 5A and 5B are schematic diagrams showing open/close states of an injection valve unit.
Figure 5B:
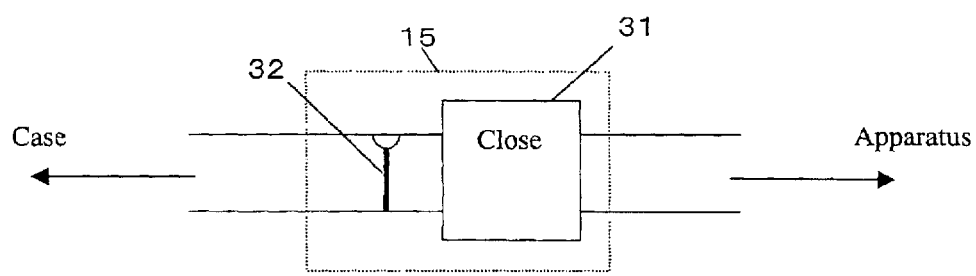
Figure 6A:
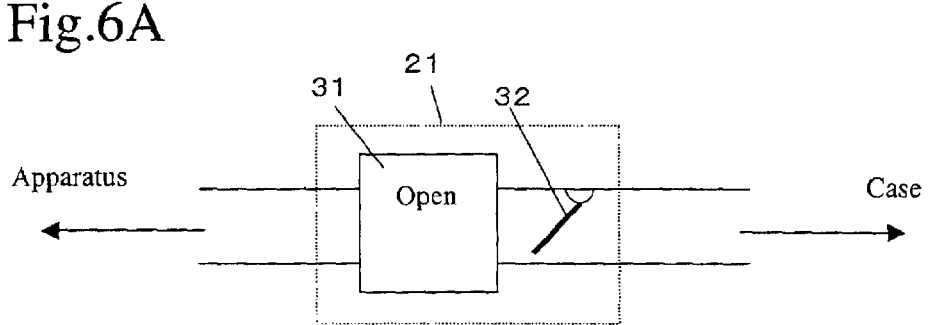
FIGS. 6A and 6B are schematic diagrams showing open/close states of a discharge valve unit.
Figure 6B:
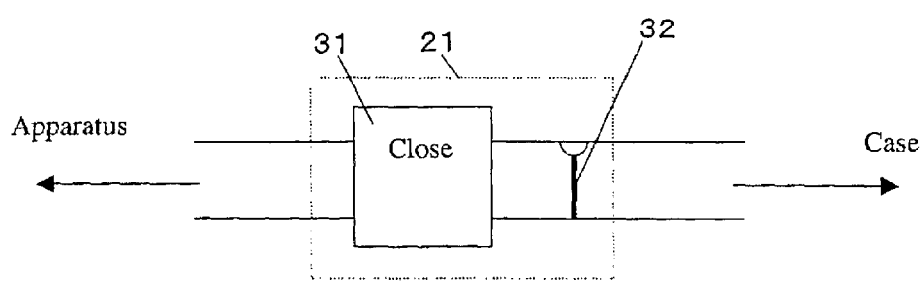

The case 3 is detachable from the thermostat 4 at the joint between the solution inlet 10 and the injection valve unit 15 as well as the joint between the solution outlet 11 and the discharge valve unit 21 as shown in FIG. 4.

The open/close states of the injection valve unit 15 and the discharge valve unit 21 are shown in FIGS. 5A–5B and 6A–6B, respectively. For example, the injection valve unit 15 and the discharge valve unit 21 are each provided with a solenoid valve 31 whose open/close states can be controlled by a valve-controlling unit 30, and a check valve 32 for preventing back flow while the solenoid valve is open. The check valve 32 can only be open toward the flowing direction of the solution and cannot open toward the back flow direction.

Figure 7:
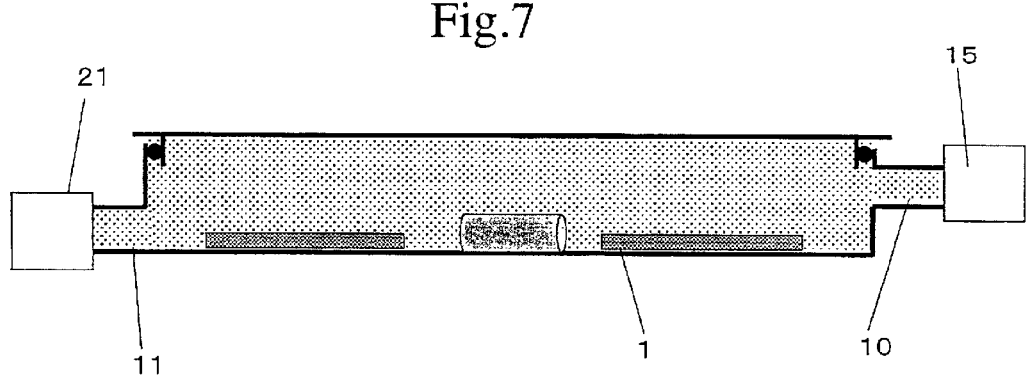
FIG. 7 is a schematic cross-sectional view showing the state of injecting a reaction solution or a washing solution into the case.
Figure 8:
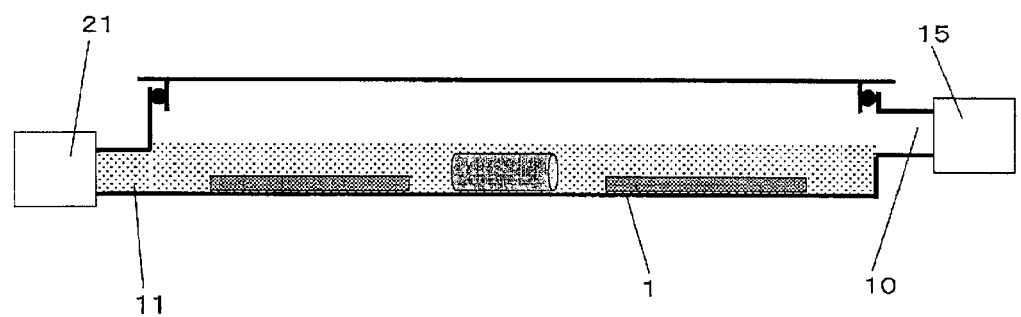
FIG. 8 is a schematic cross-sectional view showing the state of discharging the reaction solution or the washing solution from the case.

FIG. 7 shows the state of injecting a solution into the case 3. In this case, the injection valve unit 15 is opened while the discharge valve unit 21 is closed. On the other hand, FIG. 8 shows the state of discharging the solution from the case 3. In this case, the injection valve unit 15 is closed while the discharge valve unit 21 is opened. The injection valve unit 15 and the discharge valve unit 21 are controlled by the controller (control PC) 50 via the valve-controlling unit 30.

According to the present example, the amount of the solution required to fill in the case 3 is about 7.7 ml, which is about 400 times larger amount than the amount of a hybridization reaction solution required in a conventional apparatus (about 20 $\mu$l). However, the solution is diluted for that amount so that the required amount of the sample itself is the same as that required in the conventional apparatus. The solution in the case 3 accommodating the disc-shaped substrate 1 is agitated with the agitator 2 to enhance the reaction efficiency. The agitator 2 has a length of, for example, 20 mm.

In the above-described case, the sample is diluted by 400 folds as compared to a conventional sample. The increased amount of the solution allows agitation of the solution, which results in a higher reaction efficiency than that without the dilution of the solution. In other word, by appropriately agitating the reaction solution during the hybridization reaction, the effect of the increased chance of reaction due to the agitation exceeds the effect of the decreased chance of reaction due to the dilution of the sample. Since the sample volume is increased, a liquid flowing system including tubes and pumps can be employed, thereby automating the experiment procedure.

Figure 9:
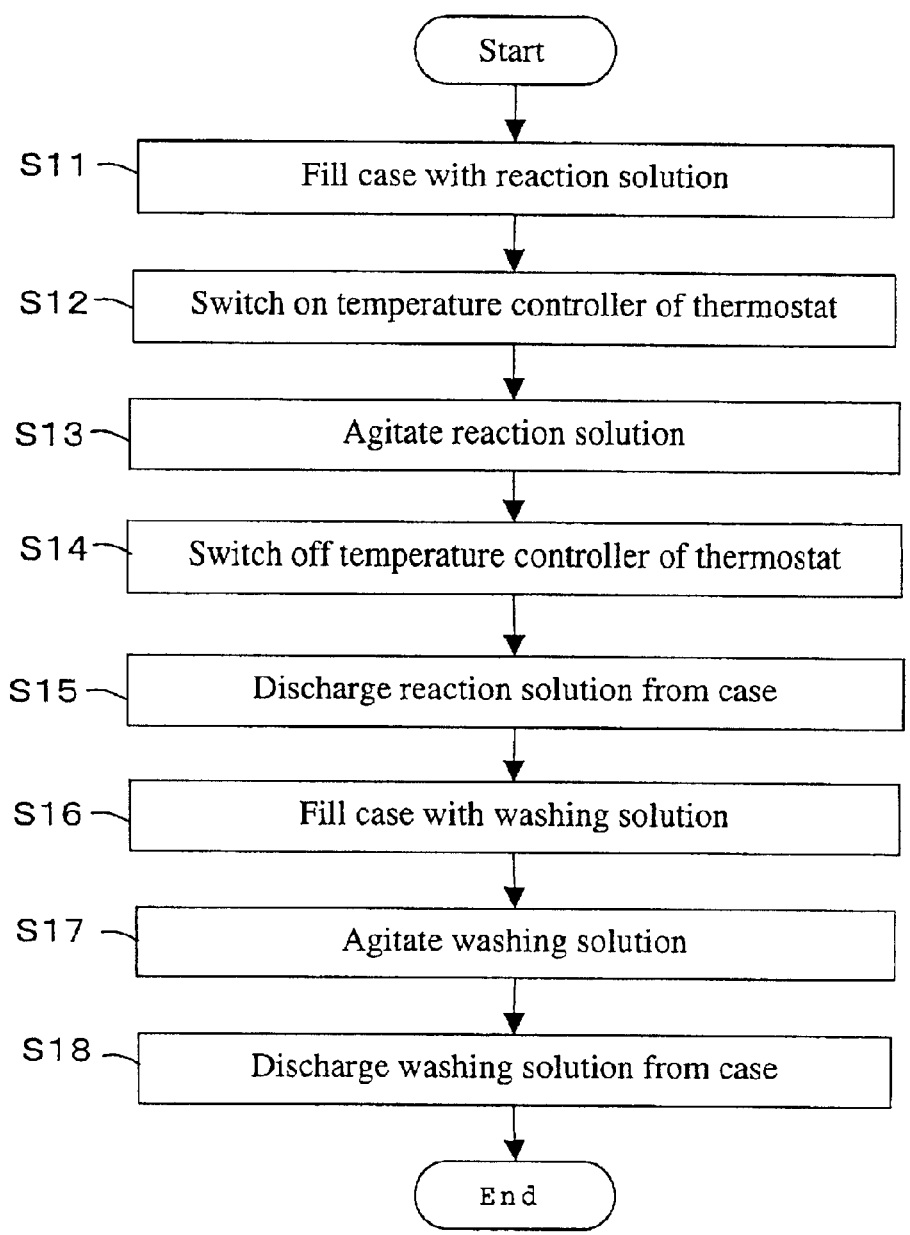
FIG. 9 is a flowchart showing a general procedure of hybridization reaction and washing steps using the apparatus of the invention.

FIG. 9 is a flowchart showing a general procedure of hybridization reaction and washing steps using the above described hybridization reaction apparatus.

First, the DNA-probe-immobilized substrate 1 is placed in the case 3, which is then set in the apparatus. Specifically, the lid 26 of the case 3 is taken off to place the biological-substance-immobilized substrate 1 inside the case 3. The substrate 1 is placed at the center of the case 3, although this is not critical. If the agitator 2 is to be used, the agitator 2 is placed in the throughhole at the center of the substrate 1. Then, the case 3 is closed with the lid 26, and set in the apparatus. At this point, the solution inlet 10 and the solution outlet 11 of the case 3 are inserted in the tubes 28 extending from the injection valve unit 15 and the discharge valve unit 21, respectively, to connect the tubes 28 with the case 3 as shown in FIG. 4.

Following the above-described preparation, the controller 50 is directed to start the reaction. In Step 11, the controller 50 fills the case 3 with the reaction solution. Specifically, the controller 50 selects the reaction solution reservoir 7 with the solution selecting valve 20, and injects the reaction solution containing the DNA sample from the reaction solution reservoir 7 into the case 3 with the injection pump 6. At this point, the injection valve unit 15 of the case 3 is opened while the discharge valve unit 21 is closed as shown in FIG. 7. When the case 3 is filled with the reaction solution, the injection valve unit 15 is closed to seal the case 3.

Next, in Step 12, the controller 50 switches on the temperature controller 16 of the thermostat to heat the entire case 3 to maintain a constant reaction temperature. The reaction temperature is usually set to 50° C. to 65° C. depending on the target DNA sample. Proceeding to Step 13, the controller 50 allows a hybridization reaction while agitating the reaction solution in the case 3. Specifically, the power source of the stirrer 5 is switched on to rotate the agitator 2, thereby agitating the reaction solution 12 filling in the case 3.

Figure 10:
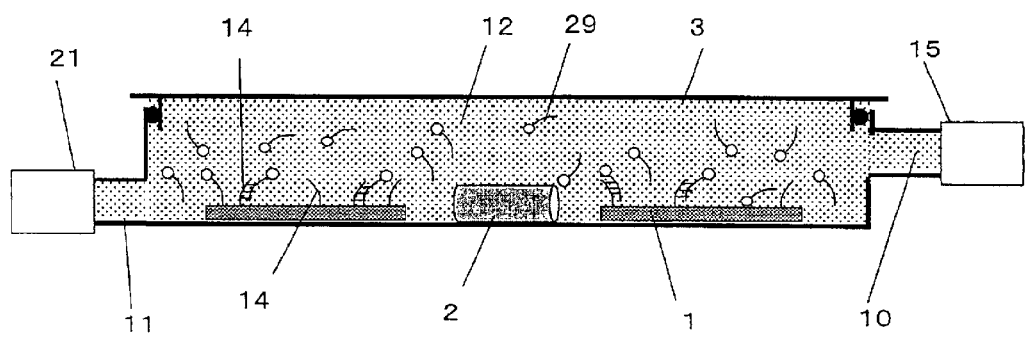
FIG. 10 is a schematic cross-sectional view showing a state of hybridization reaction inside the case.

FIG. 10 is a schematic view showing a state of the hybridization reaction inside the case 3. The probe DNAs 14 immobilized on the substrate 1 react and bind with the target DNA 29 only if their nucleotide sequences are complementary to that of the target DNA 29 contained in the reaction solution 12. Agitating the reaction solution 12 increases the chance of reaction between the target DNA 29 contained in the reaction solution and the probe DNAs 14 on the disc-shaped substrate 1, thereby enhancing the reaction efficiency. As a result, the time required for the hybridization reaction can be shortened. However, if the rotation rate of the agitator 2 is too fast, the reaction efficiency may, on the contrary, be decreased, or the reaction solution in the case may not be agitated uniformly causing inequality in the reaction efficiency across the substrate 1. Thus, according to the present example, the rotation rate of the agitator 2 is set to 1 rps. According to the present invention, the reaction time that conventionally took 15 hours or longer can be shortened to about 5 hours.

In Step 14 after the reaction, the controller 50 switches off the temperature controller 16 of the thermostat. Then, in Step 15, the controller 50 discharges the reaction solution 12 from the case 3 to the drainage reservoir 9 using the discharge pump 22. At this point, the injection valve unit 15 in the case 3 is closed while the discharge valve unit 21 is opened as shown in FIG. 8. By controlling the injection valve unit 15 and the discharge valve unit 21, the solution is accurately discharged from the case 3.

Proceeding to Step 16 after discharging the reaction solution, the controller 50 selects the washing solution reservoir 8 with the solution selecting valve 20 to inject the washing solution into the case 3 with the injection pump 6. At this point, the injection valve unit 15 is opened while the discharge valve unit 21 is closed as shown in FIG. 7. The discharge valve unit 21 may also be opened for a short while upon starting injection of the washing solution to allow the washing solution to flow through the case 3. Once the case 3 is filled with the washing solution, the injection valve unit 21 is closed and the procedure proceeds to Step 17 where the controller 50 gives a driving signal to the stirrer 5 in the same manner as in the hybridization reaction, whereby the washing solution is agitated to wash the substrate.

Figure 11:
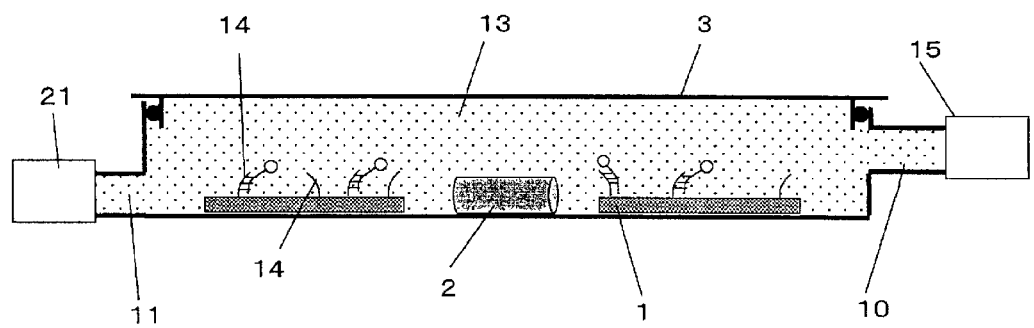
FIG. 11 is a schematic cross-sectional view showing a state of washing inside the case.

FIG. 11 is a schematic view showing a state of washing the substrate 1 inside the case 3. After the target DNA contained in the reaction solution is discharged by discharging the reaction solution, the target DNA that did not hybridize with the probe DNA 14 and remaining on the substrate 1 is washed off by the subsequent washing step. The washing solution 13 is injected into the case 3 in a similar manner to the injection of the reaction solution to wash the substrate 1. The washing step needs to be carried out accurately, and thus is repeated for a several times. By agitating the washing solution 13 with the agitator 2, the washing can be carried out in short time.

After the washing, the procedure proceeds to Step 18 where the controller 50 closes the injection valve unit 15 and opens the discharge valve unit 21 as shown in FIG. 8 to discharge the washing solution 13. According to the present example, the washing solution used is 0.2×SSC/0.1% SDS solution, and in order to wash the surface of the substrate for sure, the rotation rate of the rotator (agitator) 2 is set to 2 rps and a 10-minute washing step is repeated for three times.

The substrate that has undergone the hybridization reaction is taken out from the case and mounted on a detection apparatus (not shown) to detect the reaction results. The above-described hybridization reaction method has merits over conventional methods, for example, the reaction time and the washing time can be shortened and procedure from the reaction through the washing can be automated.

Figure 12:
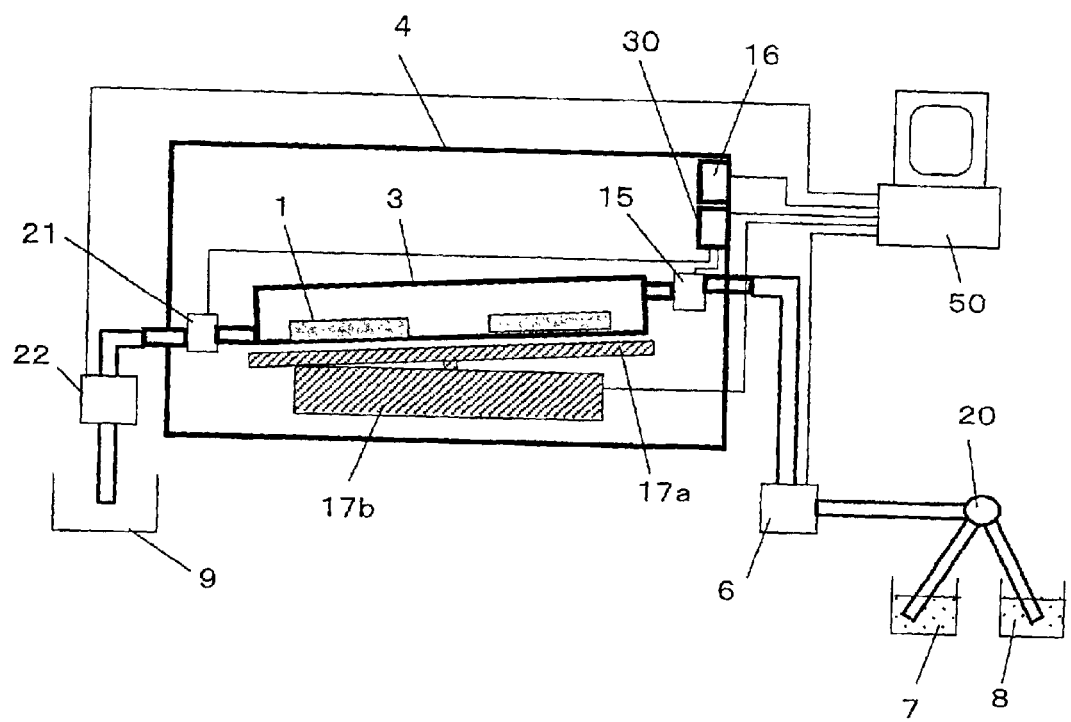
FIG. 12 is a schematic view for illustrating an apparatus of the invention which is used where agitation takes place by shaking the case.

FIG. 12 is a schematic cross-sectional view showing another example of the hybridization reaction apparatus according to the present invention. In FIG. 12, same reference numerals denote the same components as in FIG. 1, and the description thereof is omitted.

While the reaction apparatus shown in FIG. 1 is capable of shortening the reaction time by agitating the reaction solution with the agitator to enhance the reaction efficiency, the reaction apparatus shown in FIG. 12 shakes the case 3 to agitate the reaction solution to enhance the reaction efficiency, thereby shortening the reaction time. According to this example, shaking refers to a see-saw movement with the supporting point at the center. The hybridization reaction apparatus shown in FIG. 12 differs from the hybridization reaction apparatus shown in FIG. 1 in that it is provided with a shaker 17 instead of the stirrer 5.

The shaker 17 includes a platform 17a for mounting the case 3 and a shaking member 17b. The shaking member 17b moves the alternate ends of the platform 17a up and down while supporting the platform 17a at the center to shake the case 3 in a see-saw manner to agitate the reaction solution 12 in the case 3. If the shaking rate is too fast, the reaction efficiency may be, on the contrary, reduced. Thus, the case 3 is shaken such that the case 3 is moved for 1 cm in 2 seconds at the fastest position. The ON/OFF of the shaking member 17b, and period and oscillation of shaking can be controlled with the controller 50. The case 3 mounted in the apparatus is connected to a pipe system of the apparatus via tubes 28 that are sufficiently long not to interfere with the shaking movement of the case 3 as shown in FIG. 4.

The hybridization reaction and washing steps using the above-described hybridization reaction apparatus are generally the same as the steps described with reference to FIG. 9 except that the shaker 17 is used instead of the stirrer 5 upon agitating the reaction solution in Step 13 and the washing solution in Step 17.

Figure 13:
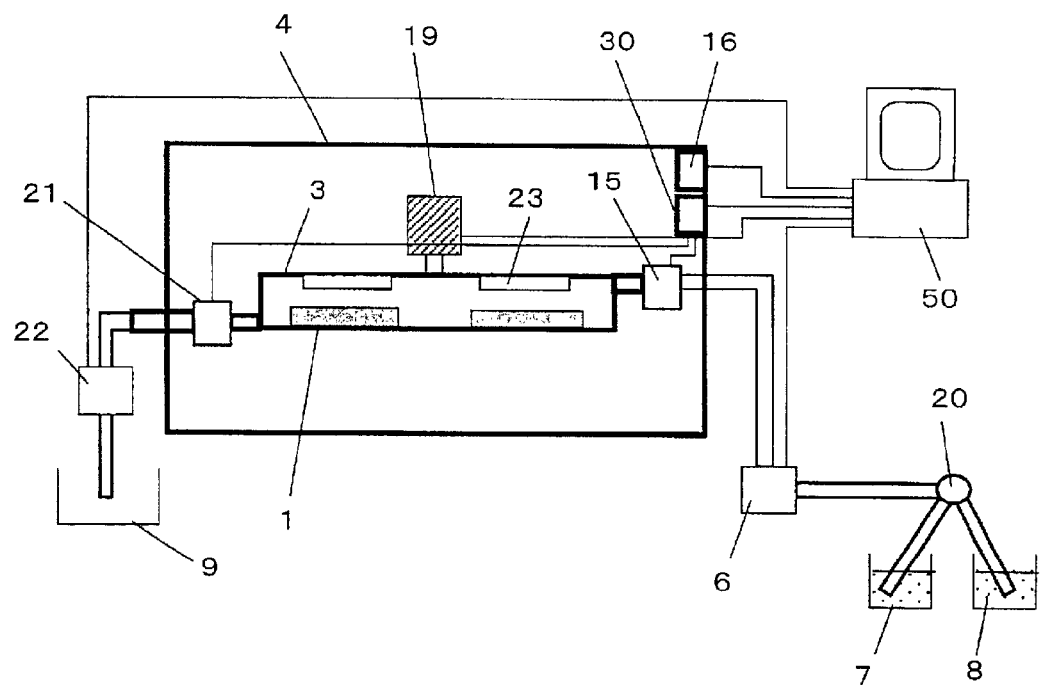
FIG. 13 is a schematic view for illustrating an apparatus of the invention which is used where agitation takes place by rotating agitation fans.

FIG. 13 is a schematic cross-sectional view showing yet another example of a hybridization reaction apparatus according to the present invention. In FIG. 13, same reference numerals denote the same components as in FIG. 1, and the description thereof is omitted.

The hybridization reaction apparatus shown in FIG. 13 is provided with agitation fans 23 on the lid 26 of the case 3. By rotating the fans 23, the reaction solution is agitated, thereby enhancing the reaction efficiency and shortening the reaction time. The power source of the rotation motor and an I/O cable for control are arranged together. The I/O cable is connected to the controller 50.

Figure 14:
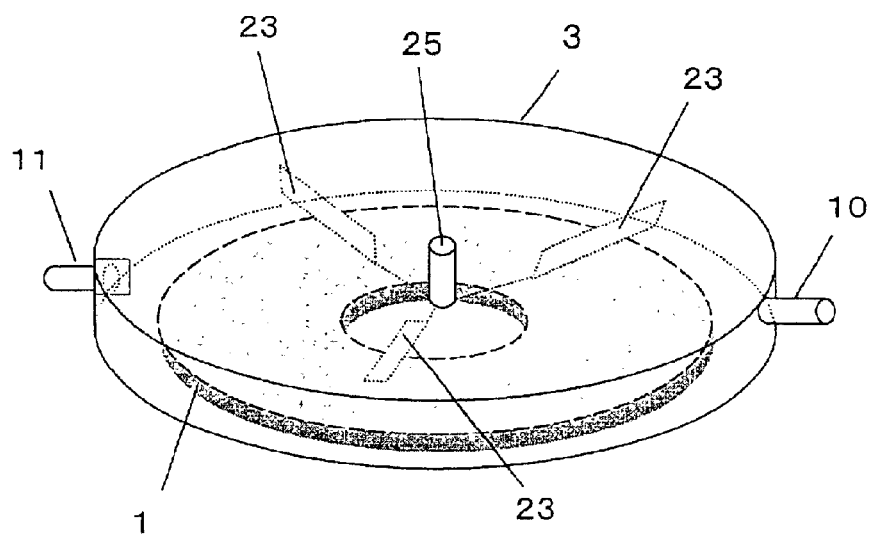
FIG. 14 is a schematic view showing a structure of a case where agitation takes place by rotating the agitation fans.
Figure 15:
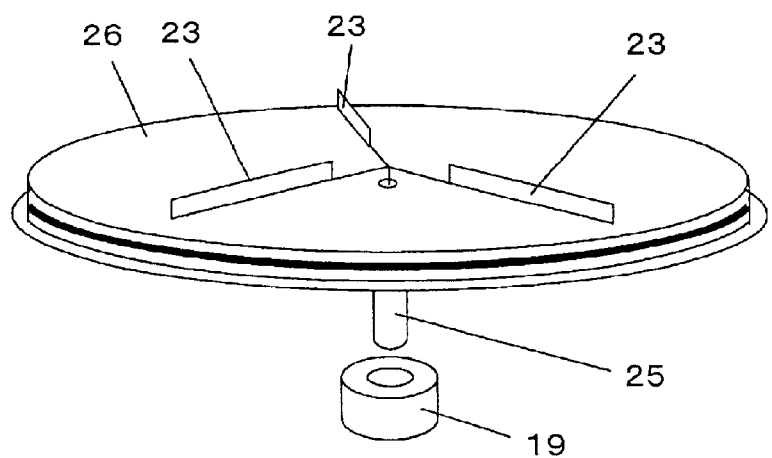
FIG. 15 is a schematic view showing a structure of a case provided with a lid.

FIG. 14 is a perspective view showing the case accommodating the substrate. FIG. 15 is a perspective view of the lid provided with the fans. The agitation fans 23 have, for example, a length of 20 mm and a height of 3 mm. The agitation fans 23 are fixed to a rotation axis 25 to be rotatably attached to the lid 26 of the case. When the case 3 is mounted in the apparatus, the rotation axis 25 protruding from the lid 26 is connected to a rotation motor 19 in the apparatus. When the rotation axis 25 is rotated by the rotation motor 19, the agitation fans 23 are also rotated to agitate the reaction solution 12. The rotation motor 19 is controlled by the controller 50. When the rotation speed of the agitation fans 23 is too fast, the reaction solution may not be agitated in a stable manner for a long time and the reaction efficiency may be reduced. Therefore, in the present example, the rotation speed is set to 1 rps.

The procedure of the hybridization reaction and washing steps using the above-described hybridization reaction apparatus is generally the same as that described with reference to FIG. 9 except that the rotation motor is used instead of the stirrer upon agitating the reaction solution and the washing solution.

According to the present invention, the reaction time can be shortened by performing a hybridization reaction while agitating the reaction solution. However, in order to agitate the reaction solution, a larger amount of the reaction solution needs to be injected into the case 3 that accommodates the substrate 1, as compared to the conventional methods where the sample is dropped on the probe-immobilized substrate, which is then covered with a glass cover to carry out the reaction. Accordingly, in order to use the sample for the same amount as the amount used in the conventional methods, the sample needs to be diluted to a great extent.

Problems concerning the sample amount or the sample dilution ratio will be described with reference to FIG. 16.

Figure 16:
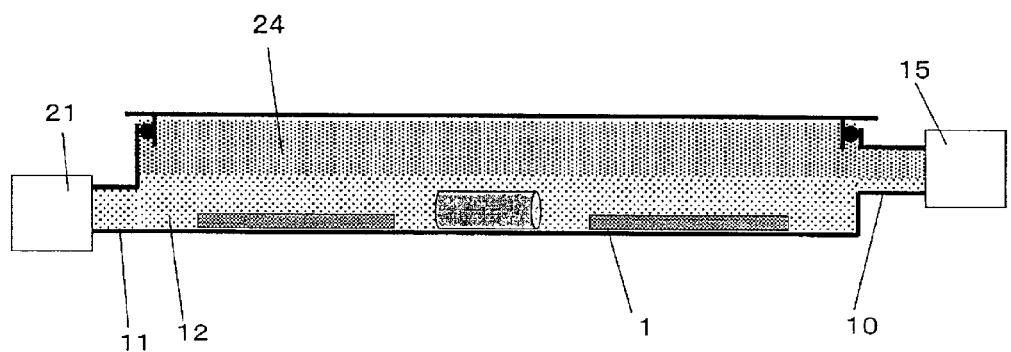
FIG. 16 is a schematic cross-sectional view showing a state inside a case where a supernatant solution is used upon reaction.

FIG. 16 is a cross-sectional view showing a case upon the hybridization reaction, which corresponds to the case shown in FIG. 10.

The structure of the case shown in FIG. 16 is identical to that shown in FIG. 10 except the solution injected into the case. Referring to FIG. 10, the entire volume of the case is filled with the reaction solution. On the other hand, in FIG. 16, a reaction solution 12 is injected into the case 3 to a depth that the probe-immobilized substrate placed on the bottom of the case 3 is just immersed, and then a liquid 24 is injected whose liquid density is lighter than that of the reaction solution and thus which does not mix with the reaction solution. The liquid 24 used may be, for example, liquid paraffin (liquid density 0.83 to 0.86) or mineral oil (liquid density 0.84 to 0.88). By filling the case 3 with the reaction solution 12 and the liquid 24 which does not mix with the reaction solution 12 and which stays above the reaction solution 12, the reaction solution 12 can be agitated with a minimized amount or a minimized dilution ratio of the reaction solution needed.

As an exemplary structure of such an apparatus, a reservoir containing the liquid 24 may be added to the solution injecting member of the apparatus shown in FIG. 1 while the solution selecting valve 20 is replaced with one that can select among three types of solution reservoirs. Moreover, in Step 11 of the procedure shown in FIG. 9, the controller 50 may first inject a predetermined amount of the reaction solution 12 into the case and then inject the liquid 24 above the reaction solution 12.

Although a disc-shaped substrate with a throughhole at the center has been described as a probe-immobilized substrate, the throughhole of the substrate is not requisite if the hybridization reaction apparatus does not use the agitator. In the case of shaking agitation, the shape of the substrate may be other than a disc-shape (e.g., a rectangular shape). When a rectangular substrate is used, the case for accommodating the substrate preferably has a rectangular shape.

According to the present invention, hybridization reaction and washing steps can be carried out efficiently in short time. Moreover, the hybridization reaction and washing steps can be carried out continuously with a single experiment system, thereby simplifying manipulation of the experiment.

What is claimed is:

1. A hybridization reaction apparatus for performing hybridization reaction between a biological substance immobilized on a substrate and a biological substance contained in a solution, the apparatus comprising:

a case for accommodating the substrate immobilized with the biological substance;

an injecting member for injecting a solution into the case;

a discharging member for discharging the solution from the case; and an agitating member for agitating the solution injected into the case, wherein the substrate is a circular substrate with a throughhole at the center, and the agitation member comprises a driver that rotates an agitator placed in the throughhole at the center of the substrate.

2. A hybridization reaction apparatus for performing hybridization reaction between a biological substance immobilized on a substrate and a biological substance contained in a solution, the apparatus comprising:

a case for accommodating the substrate immobilized with the biological substance;

an injecting member for injecting a solution into the case;

a discharging member for discharging the solution from the case; and an agitating member for agitating the solution injected into the case, wherein the agitating member is supported exclusively at a center supporting point thereof so as to be shaken repeatedly to tilt two alternate ends of the agitating member up and down in a see-saw manner.

3. A hybridization reaction apparatus for performing hybridization reaction between a biological substance immobilized on a substrate and a biological substance contained in a solution, the apparatus comprising:

a case for accommodating the substrate immobilized with the biological substance;

an injecting member for injecting a solution into the case;

a discharging member for discharging the solution from the case; and an agitating member for agitating the solution injected into the case, wherein the agitation member comprises an agitation fan attached to the case and a rotation member for rotation the agitation fan.

4. A hybridization reaction apparatus according to claim 1, wherein the case is detachable.

5. A hybridization reaction apparatus according to claim 1, wherein the injecting member for injecting the solution comprises a solution selecting valve for selecting between the reaction solution and a washing solution, and an injection pump for sending the solution selected by the solution selecting valve to the case.

6. A hybridization reaction apparatus according to claim 2, wherein the case is detachable.

7. A hybridization reaction apparatus according to claim 2, wherein the injecting member for injecting the solution comprises a solution selecting valve for selecting between the reaction solution and a washing solution, and an injection pump for sending the solution selected by the solution selecting valve to the case.

8. A hybridization reaction apparatus according to claim 2, wherein the case is shaken by the agitating member for 1 cm in 2 seconds at fastest positions thereof.

9. A hybridization reaction apparatus according to claim 3, wherein the case is detachable.

10. A hybridization reaction apparatus according to claim 3, wherein the injecting member for injecting the solution comprises a solution selecting valve for selecting between the reaction solution and a washing solution, and an injection pump for sending the solution selected by the solution selecting valve to the case.

* * * * *